Dec. 25, 1962
C. B. REED
3,069,702
APPARATUS FOR IMPROVING POLLINATION OF BLOSSOMS
Filed March 25, 1960
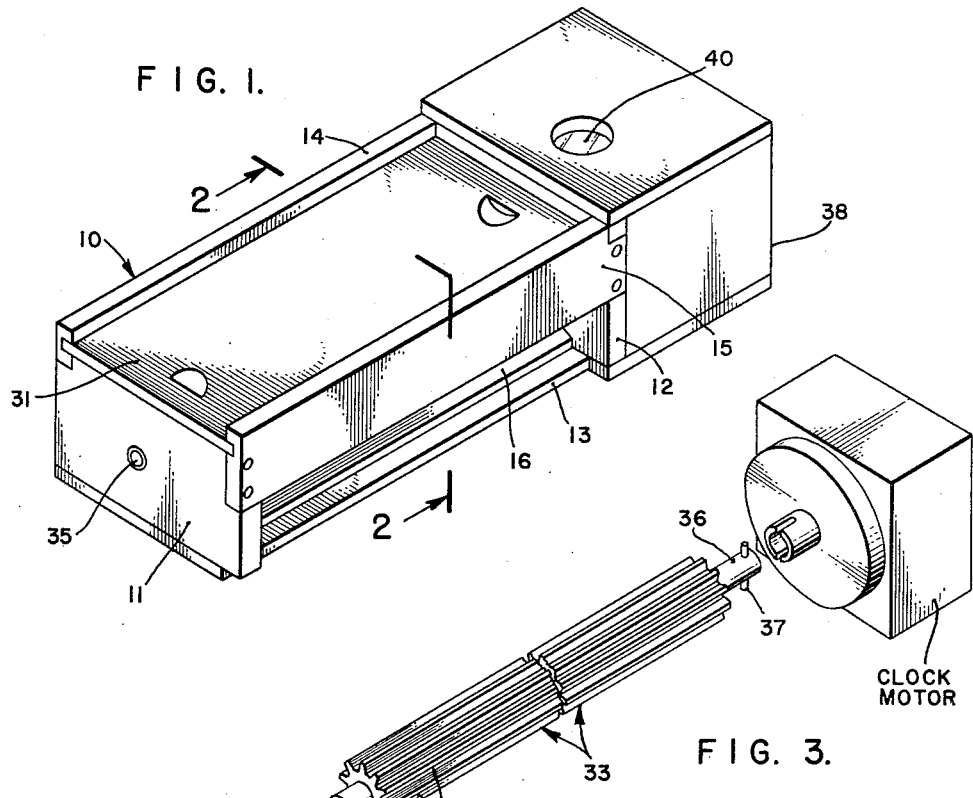
FIG. 1.
FIG. 3.
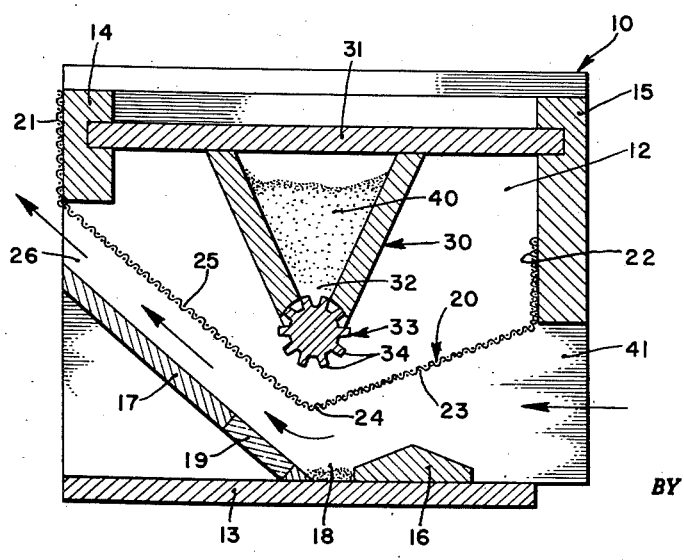
FIG. 2.
CHARLES B. REED
*INVENTOR.*
BY 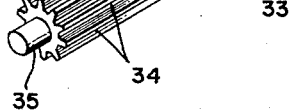
ATTORNEYS.

3,069,702
Patented Dec. 25, 1962

3,069,702
APPARATUS FOR IMPROVING POLLINATION OF BLOSSOMS
Charles B. Reed, % Valley Pollination Service,
P.O. Box 608, Bakersfield, Calif.
Filed Mar. 25, 1960, Ser. No. 17,569
4 Claims. (Cl. 6—4)

This invention relates to apparatus for coating honey bees with pollen for improving pollination of plant blossom by said honey bees. Apparatus of this general type is disclosed in the Harwood Patent No. 2,485,879, granted October 25, 1949. In the general scheme of operation, hand gathered pollen is placed in a trough through which the bees must walk in order to leave the beehive. The pollen is picked up on the legs of the bees and is carried by the bees to plant blossoms.

In the type of device shown in the Harwood patent the pollen trough may require refilling as often as three times an hour. In order to avoid the disagreeable requirement of opening the feeder device at such frequent intervals and interrupting a stream of honey bees arriving and leaving the beehive, I have developed a novel form of automatic feeder device which automatically deposits pollen at the required rate into the trough through which the honey bees walk as they leave the beehive. Moreover, some of the pollen falling from the automatic feeder device contacts the bees before reaching the trough, and is intercepted by them and clings to their bodies.

In addition to its use with hand-gathered pollen, the automatic feeder device may be used to coat bees with antibiotics or other drugs in powder form for dusting of blossoms to control diseases such as pear blight and apple blight. Accordingly, the principal object of my invention is to provide an automatic dispenser of the type described for coating bees. Another object is to provide such a device in which open mesh screen material is used for the upper boundary of the exit passage for the bees wherein pollen is fed from a hopper and gravitates through the screen into a trough in the exit passage. A related object is to provide a rotary feed element in the form of a splined rotor which controls discharge of pollen from a hopper. A cover for the hopper excludes light so that the bees do not attempt to escape from the hive through the open mesh screen but walk through the pollen-containing trough toward an exit ramp leading to an escape opening. Other and more detailed objects and advantages will appear hereinafter.

In the drawings:

FIGURE 1 is an isometric view showing a preferred form of this invention.

FIGURE 2 is an enlarged transverse sectional view taken substantially on the lines 2—2 as shown in FIGURE 1.

FIGURE 3 is an isometric view of the rotary feed element.

Referring to the drawings, the feeder device generally designated 10 is adapted to be mounted on the entrance and exit ledge adjacent the conventional opening into a beehive, not shown. The device includes parallel upright end walls 11, 12 connected by a horizontal bottom wall 13. The front wall 14 and rear wall 15 also connect the end walls 11 and 12. A floor block 16 extends between the end walls and is fixed on the bottom wall 13. This floor block 16 cooperates with the inclined exit ramp 17 to define a trough 18 which extends between the end walls 11 and 12. The lower portion 19 of the ramp 17 may be formed of glass to admit light and all of the other walls are opaque to exclude light.

A ceiling partition 20 is formed of open mesh screen material, for example, "hardware cloth." This ceiling partition is secured at its ends 21 and 22 to the front wall 14 and rear wall 15 respectively and has a first portion 23 sloping downward from the rear wall 15 through a low position 24 above the trough 18. A second portion 25 of the ceiling partition 20 extends upward from said low position 24 to the elevated escape opening 26 between the upper end of the ramp 17 and the front wall 14.

Positioned between the front wall 14 and the rear wall 15 and above the ceiling partition 20 and extending between the end walls 11 and 12 is provided a hopper generally designated 30. This hopper has an open top closed by the sliding closure 31 which is mounted in grooves formed in the walls 14 and 15. The hopper 30 has a bottom discharge opening 32 extending along the open portion thereof parallel to the trough 18, and a rotary member 33 is mounted in the discharge opening to control the rate of discharge of pollen therefrom. The rotary member 33 is preferably provided with a series of axially extending external splines 34.

As shown in FIGURE 3 the rotary member 33 is provided with axially extending trunnions 35 and 36 at its opposite ends. These trunnions are rotatably supported in the upright end walls 11 and 12. The trunnion 35 which extends through the end wall 12 carries a cross pin 37 at its projecting end which extends into the enclosure 38. A suitable clock driven device, not shown, contained within the enclosure 38 engages the cross pin 37 for turning the member 33 slowly at a controlled rate. An inspection opening 40 having a transparent window may be provided for observing the action of the clock motor within the enclosure 38.

In operation, a quantity of pollen 40 or other powdered material is placed in the hopper 30 and the closure 31 is installed in position. The clock motor, not shown, is caused to drive the rotary member 33. The entire device 10 is placed on the shelf or entry ledge of a beehive, not shown, and positioned so that bees leaving the hive are required to pass into the opening 41 below the rear wall 15. The bees travel through the exit passage in the direction marked by the arrows in FIGURE 2. The closure 31 not only prevents escape of valuable pollen or drugs from the interior of the hopper 30 but also excludes light so that the honey bees do not attempt to escape from the beehive through the open mesh hardware cloth of the ceiling partition 20 but on the contrary, walk through the trough 18 toward the translucent panel 19. Pollen or other material discharged by the slowly turning feed member 33 drops by gravity through the open mesh screen of the ceiling partition 20 and falls into the trough 18. Bees walking toward the light transmitted by the translucent panel 19 pass through the trough 18, and some of the falling material is intercepted by their bodies. Particles of pollen or other material in the trough adhere to the legs of the bees. The bees travel up the exit ramp 17 and emerge at the elevated escape opening 26 and fly away. After dusting the blossoms with pollen or other material the bees return to the beehive through the conventional inlet slot, not shown.

Having fully described my invention, it is to be understood that I do not wish to be limited to the details set forth above, but my invention is of the full scope of the appended claims.

I claim:

1. Apparatus for use with a beehive, comprising in combination: walls forming an exit passage for bees leaving a beehive, said walls including a floor having a trough through which the bees must pass, said walls also including a ceiling partition formed of open mesh screen, the ceiling partition having a first portion sloping downward to a low position over said trough and a second portion sloping upward from said low position to an elevated escape opening above the floor, said walls including an inclined ramp extending from the trough and below said second portion of the ceiling partition to said escape opening, a hopper for pollen or other powdered material positioned above the ceiling partition, the hopper having a bottom discharge opening above the ceiling partition and parallel to said trough, a movable member positioned in said discharge opening of the hopper to control the rate of discharge of material therefrom, the discharged material passing by gravity through the ceiling partition screen and into the trough, means for driving said movable member, and a removable closure for the hopper acting to exclude light from the upper surface of said ceiling partition.

2. Apparatus for use with a beehive, comprising in combination: walls forming an exit passage for bees leaving a beehive, said walls including upright end walls and a floor having a trough through which the bees must pass, said walls also including a ceiling partition formed of open mesh screen, the ceiling partition having a first portion sloping downward to a low position over said trough and a second portion sloping upward from said low position to an elevated escape opening above the floor said walls including an inclined ramp extending from the trough and below said second portion of the ceiling partition to said escape opening, a hopper for pollen or other powdered material positioned above the ceiling partition and between said upright end walls, the hopper having a bottom discharge opening above the ceiling partition and parallel to said trough, a rotary member turnably supported on said upright end walls and positioned in said discharge opening of the hopper to control the rate of discharge of material therefrom, the discharged material passing by gravity through the ceiling partition screen and into the trough, power means adapted to turn said rotary member, and a removable closure for the hopper acting to exclude light from the upper surface of said ceiling partition.

3. Apparatus for use with a beehive, comprising in combination: walls forming an exit passage for bees leaving a beehive, said walls including upright end walls and a floor having a trough through which the bees must pass, said walls also including front and rear walls connecting said end walls, a ceiling partition formed of open mesh screen and supported by said front and rear walls, the ceiling partition having a first portion sloping downward to a low position over said trough and a second portion sloping upward from said low position to an elevated escape opening above the floor adjacent said front wall, said walls including an inclined ramp extending from the trough and below said second portion of the ceiling partition to said escape opening, a hopper for pollen or other powdered material positioned above the ceiling partition and between said upright end walls, the hopper having a bottom discharge opening above the ceiling partition and parallel to said trough, a rotary member turnably supported on said upright end walls and positioned in said discharge opening of the hopper to control the rate of discharge of material therefrom, the discharged material passing by gravity through the ceiling partition screen and into the trough, power means adjacent one of said end walls adapted to turn said rotary member, and a removable closure for the hopper guided on said front and rear walls and acting to exclude light from the upper surface of said ceiling partition.

4. Apparatus for use with a beehive, comprising in combination: walls forming an exit passage for bees leaving a beehive, said walls including a floor having a trough through which the bees must pass, said walls also including a ceiling partition having a first portion sloping downward to a low position over said trough and a second portion sloping upward from said low position to an elevated escape opening above the floor, said ceiling partition having openings therein at said low position, said walls including an inclined ramp extending from the trough and below said second portion of the ceiling partition to said escape opening, a hopper for pollen or other powdered material positioned above the ceiling partition, the hopper having a bottom discharge opening above the ceiling partition and parallel to said trough, a movable member positioned in said discharge opening of the hopper to control the rate of discharge of material therefrom, the discharged material passing by gravity through the openings in the ceiling partition and into the trough, means for driving said movable member, and a removable closure for the hopper acting to prevent light from entering said trough through the openings in said ceiling partition.

References Cited in the file of this patent

UNITED STATES PATENTS

| | | |
|---|---|---|
| 472,456 | Hawley | Apr. 5, 1892 |
| 944,072 | Buffum | Dec. 21, 1909 |
| 2,485,879 | Harwood | Oct. 25, 1949 |

FOREIGN PATENTS

| | | |
|---|---|---|
| 734,701 | France | Aug. 8, 1932 |